United States Patent [19]

John et al.

[11] Patent Number: 4,715,123

[45] Date of Patent: Dec. 29, 1987

[54] ROTARY TRIMMER WITH SELF-CONTAINED COLLECTION MEANS

[75] Inventors: Ansel N. John, Centerville, Ohio; Richard L. Jackson, 7193 N. Preble County Line Rd., Lewisburg, Ohio 45338

[73] Assignee: Richard L. Jackson, Lewisburg, Ohio

[21] Appl. No.: 885,141

[22] Filed: Jul. 14, 1986

Related U.S. Application Data

[63] Continuation-in-part of Ser. No. 702,400, Feb. 15, 1985, Pat. No. 4,672,744.

[51] Int. Cl.⁴ ............................................. B26B 7/00
[52] U.S. Cl. ....................................... 30/276; 30/347; 56/12.7
[58] Field of Search ................... 30/276, 347; 56/295, 56/12.7, 16.6, 16.9, 202, 13.4

[56] References Cited

U.S. PATENT DOCUMENTS

| | | | |
|---|---|---|---|
| 1,871,606 | 8/1932 | Haddad. | |
| 2,832,194 | 4/1958 | Beuerle | 30/276 X |
| 2,867,040 | 1/1959 | Mertesdorf | 30/205 |
| 3,050,854 | 8/1962 | Becker et al. | 30/376 |
| 3,460,629 | 8/1969 | Shapland et al. | 56/16.9 X |
| 3,672,139 | 6/1972 | Duran et al. | 56/16.9 X |

*Primary Examiner*—Douglas D. Watts
*Attorney, Agent, or Firm*—Gustalo Nunez

[57] ABSTRACT

A light weight portable hand-held apparatus for cutting and trimming vegetation, hedges, trees and the like and which is provided with a rotatable blade housing having a plurality of cutting blades, said blades being square-shaped or U-shaped in configuration and each blade having a plurality of cutting edges. A shroud designed for efficient entrainment of cuttings to a storage area and for providing protection from flying debris which may result by the cutting action of the blades. The cutting apparatus is provided with a self-contained receptacle for collecting the cut vegetation and branches, said receptacle being designed for easy emptying. The unique cutting blades used herein result in the cuttings being transformed into a fine residue which increases the collecting volume capacity of a self contained collection receptacle. The cutting apparatus is provided with a safety switch which requires both of the user's hands to be on the apparatus for safety during operation.

8 Claims, 16 Drawing Figures

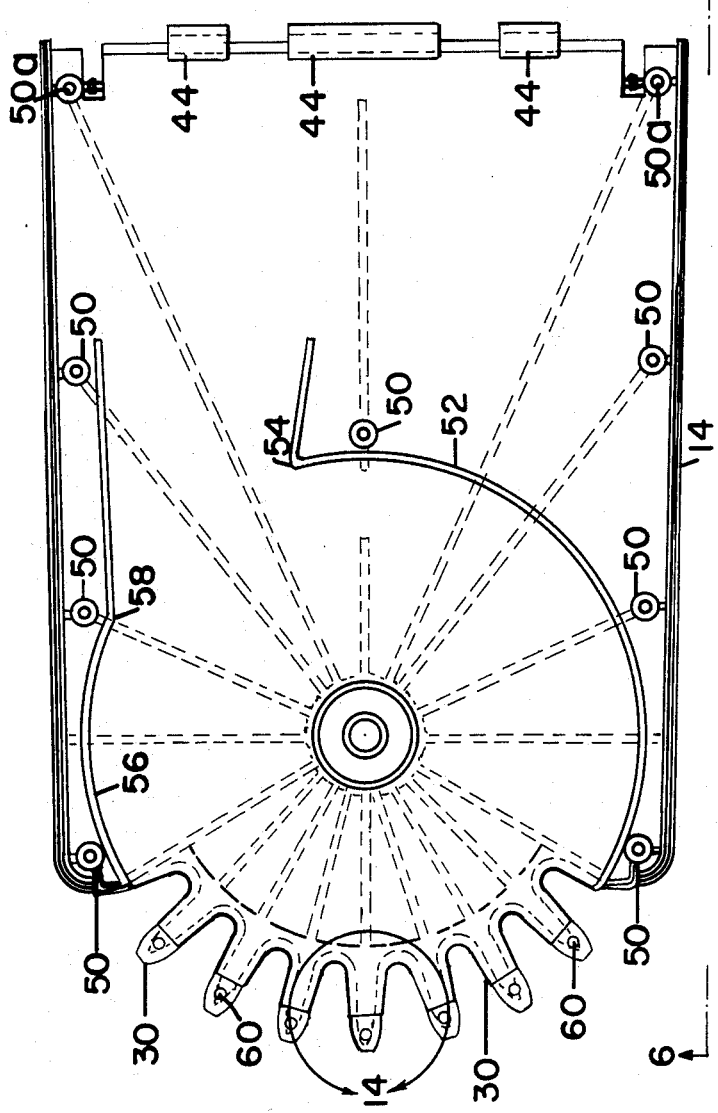

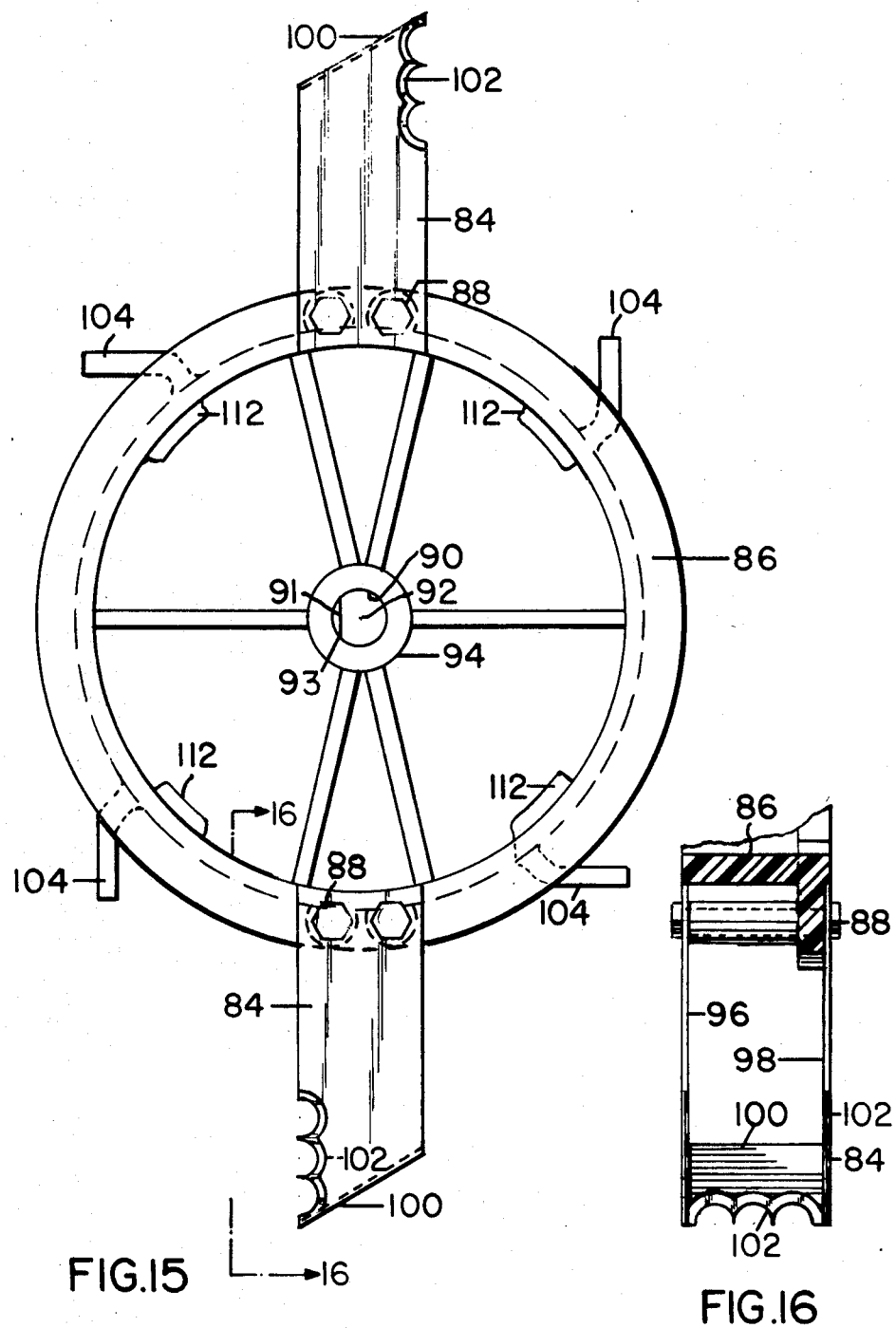

ROTARY TRIMMER WITH SELF-CONTAINED COLLECTION MEANS

RELATED APPLICATION

This application is a continuation-in-part of our co-pending application, Ser. No. 702,400 filed Feb. 15, 1985, now U.S. Pat. No. 4,672,744.

BACKGROUND OF THE INVENTION

This invention relates to an improved lightweight hand-held cutting apparatus for cutting and trimming vegetation such as hedges, bushes, and the like. The preferred embodiment is in the form of a single handled, lightweight hand-held rotary cutting device which is safe to the user and to those others who may be nearby. The cutting apparatus is provided with self-contained collection means for receiving the cut vegetation.

The prior art is profuse with attempts to provide a safe, reliable, portable cutting apparatus. Some prior art devices utilize reciprocating metal cutting blades and other use rotating metal and/or flexible cutting blades. Many of the prior art attempts display the disadvantage in that they are not as safe nor as efficient as the instant invention. The user of the prior art devices can be both laborious, time consuming and more importantly, unsafe.

U.S. Pat. No. 2,867,040 discloses a rotary hedge cutter which utilizes a plurality of individual cutting teeth, all of which rotate in the same plane. This type of device will at best cut vegatation and at worst, hack vegetation. It suffers the further disadvantage in that is is almost completely incapable of preventing cut vegetation from being discharged in a dangerous manner which could cause significant injury to persons in the area. Because of the design of the cutting teeth, the cut vegetation cannot be directed to a receiving chamber such as a bag.

The comments set forth above can also be directed to the prior art device disclosed in U.S. Pat. No. 1,871,606. One difference being that this device does teach the use of cutting guides for separating the vegetation prior to cutting.

U.S. Pat. No. 3,050,854 also teaches a rotary hedge trimmer which utilizes a rotating blade of the type usually found in conventional lawnmowers. This invention also discloses the use of finger guides for separating the vegetation, but it too suffers from the same disadvantages set forth above. It does not cut the vegetation into a fine residue and cannot be used in a situation where the user would want to cause the cut vegetation to be delivered to a collector.

SUMMARY OF THE INVENTION

This invention is directed to a lightweight portable hand-held apparatus for trimming and cutting vegetation such as bushes, hedges and the like. The preferred embodiment includes a blade housing member arranged for rotation about an axis which is generally perpendicular to the plane described by the rotating blade housing member. Attached to the rotatable blade housing member are a plurality of U-shaped blades which may also take the form of square-shaped blades. The rotatable blade housing member and blades are housed within a cover member designed for the efficient transfer of the cuttings from the cutting blades to the rear of the cutting apparatus which serves as the collection receptacle, thus preventing debris from flying out of the apparatus after being cut which greatly increases the safety features of the apparatus and also eliminates the need for cleaning up the work area.

It has been found that the U-shaped blades and square-shaped blades used with this invention are highly efficient cutting elements. In addition, the cutting apparatus is equipped with a comb or as otherwise referred to, tines or feed fingers, which separate the vegetation into more manageable clumps or groups as the vegetation is being fed to the cutting blades. The rotatable blade housing also has affixed thereto, air deflector fins which function to generate an aerodynamic air flow used to transport the cut vegetation to the rear of the cutting apparatus which serves as the collecting receptacle.

It has been found that one preferred cutting blade to use with this invention is a square-shaped blade. This is a blade that is formed of two parallel projecting segments, connected at one end to a rotatable blade housing. At the other end, the two parallel projecting segments are connected by a blade segment which is perpendicular to the parallel blade segments. Another type of blade found to be satisfactory for use with the improved rotary trimmer is a U-shaped blade. This would be a blade which is connected to blade housing member at one end and extends out therefrom and at its outermost extremity is bent in a curvilinear configuration and is connected to the blade housing member with its other hand. The preferred embodiment results in the vegetation being transformed into fine powdered debris which thus requires less volume when placed in a collecting receptacle. This embodiment has been found to be excellent for cutting vegetation in horizontal, vertical and angular directions.

In its broadest concept, any type of motor can be used with the cutting apparatus, i.e., electric or fossil fuel motors may be employed. The type of motor will be determined by the location where the cutting apparatus will be used. For example, if the cutting apparatus is to be used in a residential area, an electric motor would be ideal and would also be quiet in operation. If the cutting apparatus is to be in areas where electricity is not available, gasoline motors, or battery packs could be utilized as the source of power for the rotary hedge trimmer.

It is a feature of this invention to provide safety features to minimize injury to the user. The cutting apparatus described herein requires the user to keep each hand on a switch. If one of the hands loses contact with the switch, the cutting apparatus will turn off. The cutting apparatus may be fabricated from a high impact type of material such as NYLATRON, DELRIN, or fiber glass impregnated plastic, the only requirement being that the material would be strong, lightweight and have a reasonable use life. These and other features and advantages of the instant invention will become apparent from the following detailed description.

It can be seen that the prior art teaches devices which are capable of cutting and trimming hedges, vegetation and the like with some degree of effectiveness. However, because of the prior art construction and the type of blades used, the prior art devices are capable of causing injury to persons or pets who can be struck by flying debris exiting the prior art cutting devices; and also, the blades used in the prior art are not as efficient as the cutting blade elements taught in the instant invention.

The applicant's design and debris catching means in combination with the applicant's cutting blades results in a vegetation cutting device which is highly efficient, highly economical, extremely safe, and which eliminates the need for any clean up of cut vegetation after the trimming is complete. The unique blades used in applicant's invention are so effective that when the cuttings reach the collection chamber, they are finely pulverized. Further the blades are completely encapsulated in a housing which does not inhibit or interfere with the cutting process by yet, which can prevent a finger or arm from engaging the cutting blade.

IN THE DRAWINGS

FIG. 5 is an inside view of the lower housing taken along lines 5—5 of FIG. 2.

FIG. 6 is a cross sectional view of the lower housing member taken along line 6—6 of FIG. 5.

FIG. 15 is a view of the rotatable blade housing and cutting blades in combination.

FIG. 16 is a view of the cutting blade taken along line 16—16 of FIG. 15.

DETAILED DESCRIPTION

Figure 1:
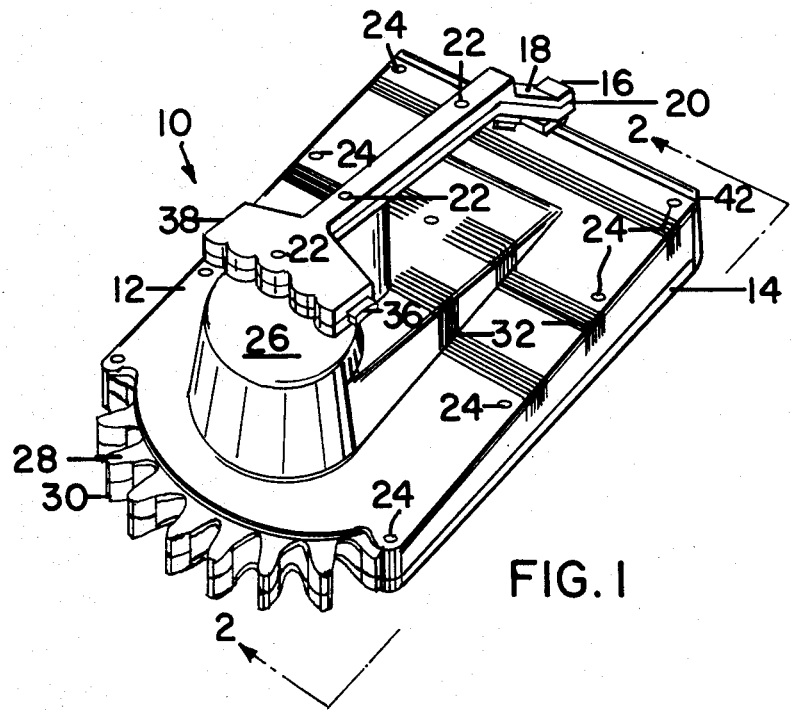
FIG. 1 is a front perspective view of one form of the cutting apparatus.
Figure 2:
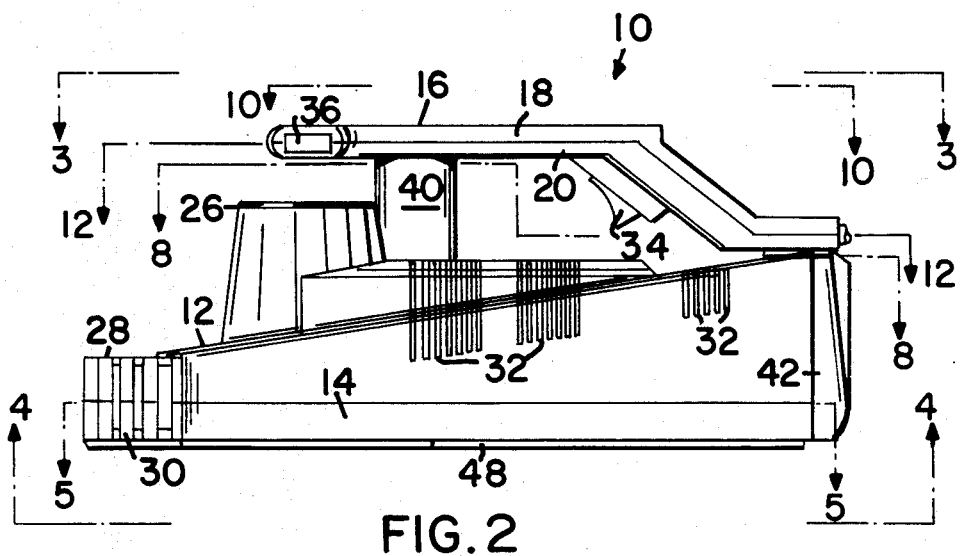
FIG. 2 is a side view taken along lines 2—2 of FIG. 1.

Referring now to FIG. 1 and FIG. 2, there is shown a portable rotary cutting device generally designated by the numeral 10. The cutting device 10 includes an upper housing member 12 and a lower housing member 14. Shown connected to the upper housing member 12 is a T-shaped handle member 16 which is formed by two members, 18 and 20. Members 18 and 20 are connected to each oather by conventional means such as screws 22 (like numbers shall be used for like members throughout this specification), and the handle 16 is connected to the upper housing member 12 by conventional connecting screws 21. The upper housing member 12 is in turn connected to the lower housing member 14 by conventional connecting means such as screws 24.

The upper housing member 12 is provided with a cylindrical housing 26 which is utilized in accommodating an electric motor. Looking at the forward portion of the cutting device 10 are a plurality of projections or tines 28 which extend circumferentially outwardly at an equal radius from a point located at the center (not shown) of the motor housing 26. The tines 28 resemble projecting fingers and are all identical to each other. There is a vertically projecting column 40 arising from the upper housing member 12 which is used to support the handle 16.

Provided on the lower housing member 14 are projections or tines 30 which are mirror images to the tines 28 such that when the cutting apparatus 10 is completely assembled, the tines 28 and 30 form one unitary finger projection, the purpose for which will soon become apparent. Also formed on the upper housing member 12 are air vents 32 which serve the dual purpose of cooling and providing ane xit for the air stream generated by the operation of the rotary cutting device 10.

Referring to FIG. 2, on the handle 16, there is a conventional on/off electric switch at 34, and located ont he T-shaped handle are a pair of conventional on/off electrical switches at 36 and 38. An explanation for the switches will be found later in this specification.

Again referring to FIG. 2, there is located at the rear portion of the lower housing 14 a hingedly connected door 42 said hinged connection located at 44. The hinged door 42 is biased in a plane perpendicular to plane described by the bottom of lower housing 14, said biasing means and in this instance being a pair of coiled springs 46.

Housing member 12 and 14 may be formed by conventional pre-injection molding methods which lend themselves very efficiently to apparatus such as is described herein.

Figure 4:
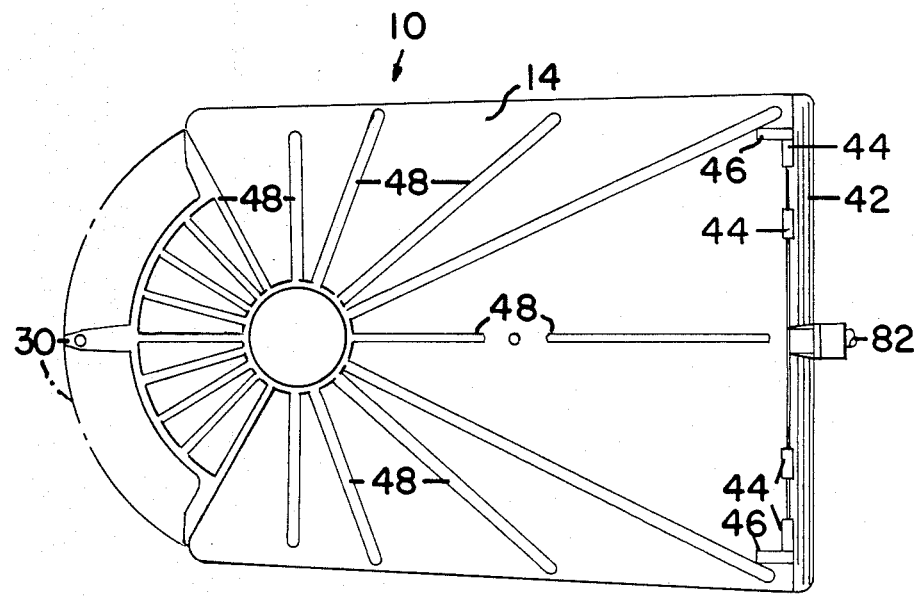
FIG. 4 is a bottom view taken along lines 4—4 of FIG. 2.

Referring to FIG. 4, which depicts the outside bottom surface of the lower housing member 14 are a plurality of projections or shoulders 48 which provide mechanical strength to the lower housing member 14.

Referring now to FIG. 5, there is shown an inside view of the lower housing 14. There are shown a plurality of mounting posts 50 which are used when connecting the upper housing member 12 to the lower housing member 14 by the use of conventional connecting means such as screws. The mounting posts 50a located at the rearward portion of the lower housing 14 are also utilized for providing a support standard for the biasing springs 46 to the hinged door 42. A curved shoulder 52 is located on the lower housing 14, said curved configuration 52 terminating at 54 and continuing at a slight angular direction towards the rear portion of the lower housing 14. Also located on the lower housing 14 is a sligthly upraised shoulder at 56 terminating at 58 and continuing on in a rearwardly direction towards the rear of lower housing member 14.

Figure 7:
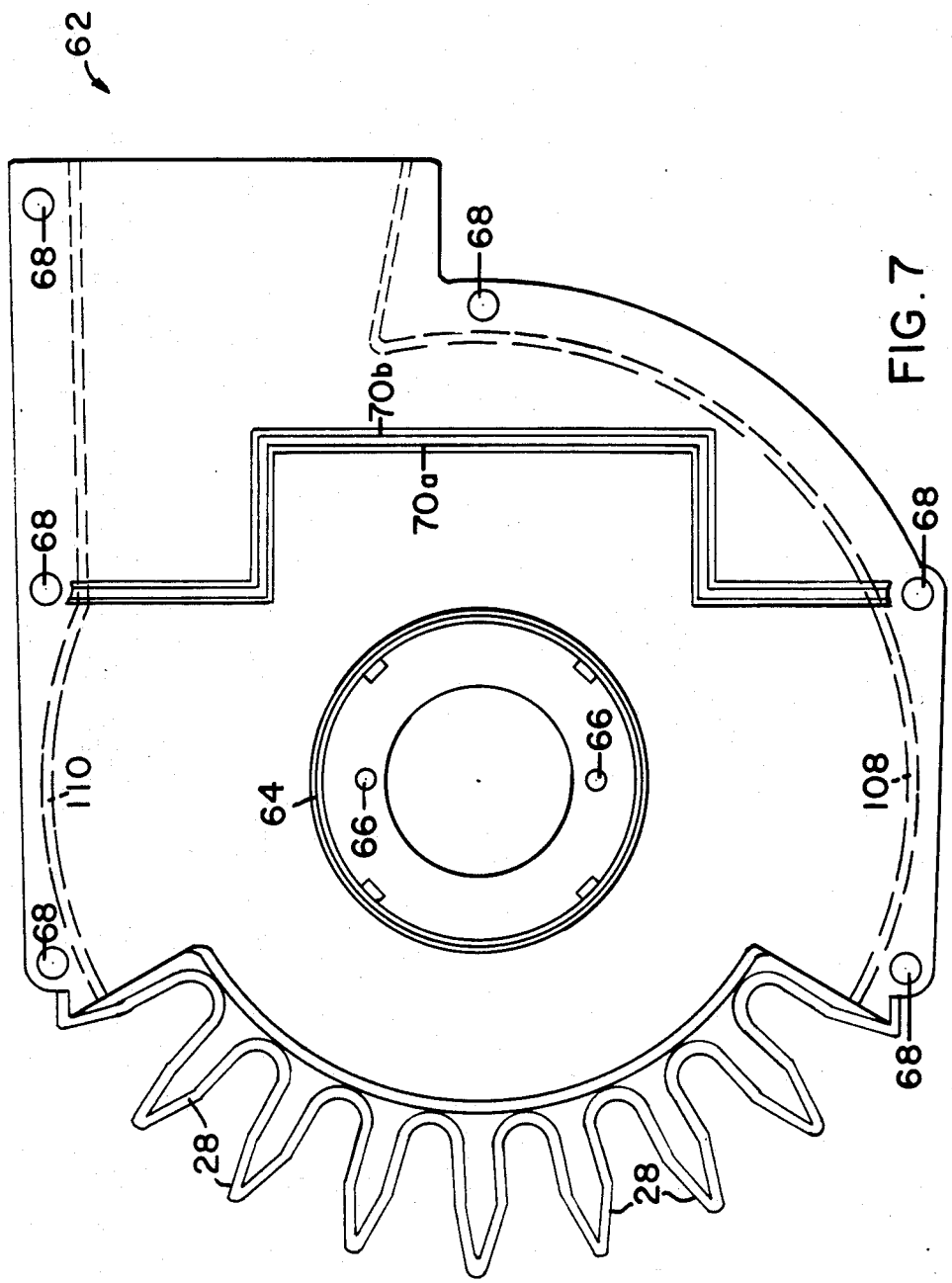
FIG. 7 is a top view of an intermediate member housing the rotating means.

FIG. 7 illustrates an intermediate member 62 which at the forward end thereof is provided with a plurality of tines 28 extending radially outward at the identical radius that the tines 30 are defined by. The tines 28 are provided with openings on their bottom surface which are complementary to the openings 60 located on the tines 30. In assembly, these openings are used for connecting purposes. An electric motor 64 is mounted on the intermediate member 62 by connecting screws 66. Openings 68 are also provided an intermediate member 62 and are used connecting the intermediate member 62 to the upper housing member 12 and to the lower housing member 14. When so assembled, the openings 68 are in alignment with the openings 24a found on the upper housing member 14. The bottom surface of the intermediate member 62 is provided with a pair of upwardly extending curvilinear shoulders 108 and 110 which are complimentary to the shoulder projections 52 and 56

(FIG. 5). The motor 64 is accommodated within the housing 26 which is a part of the upper housing 12. There is also shown on the intermediate member 62, a pair of parallel shoulder members 70a and 70b which provide rigidity to the surface of intermediate member 62 and also provide a defined channel 71.

Figure 3:
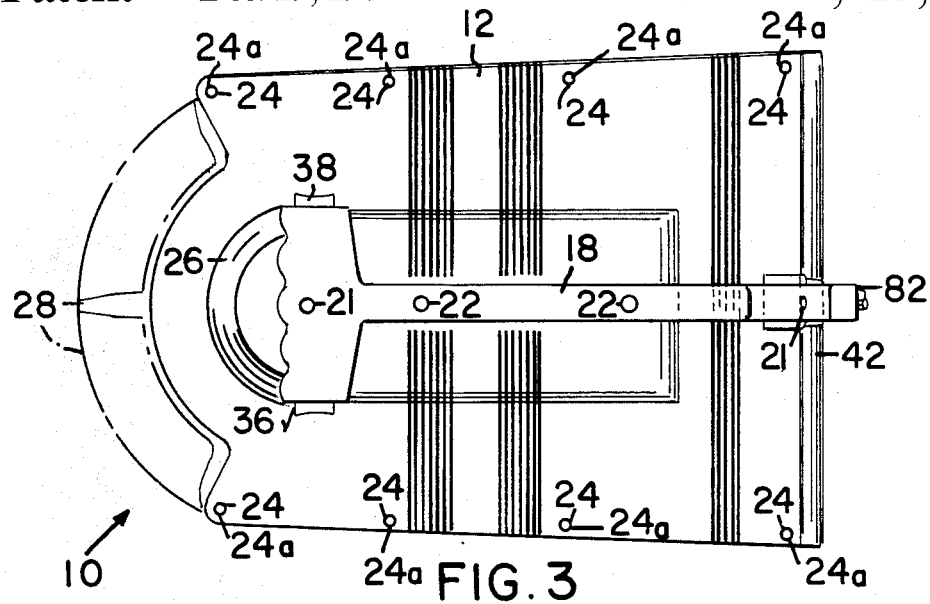
FIG. 3 is a partial top view taken along lines 3—3 of FIG. 2.
Figure 8:
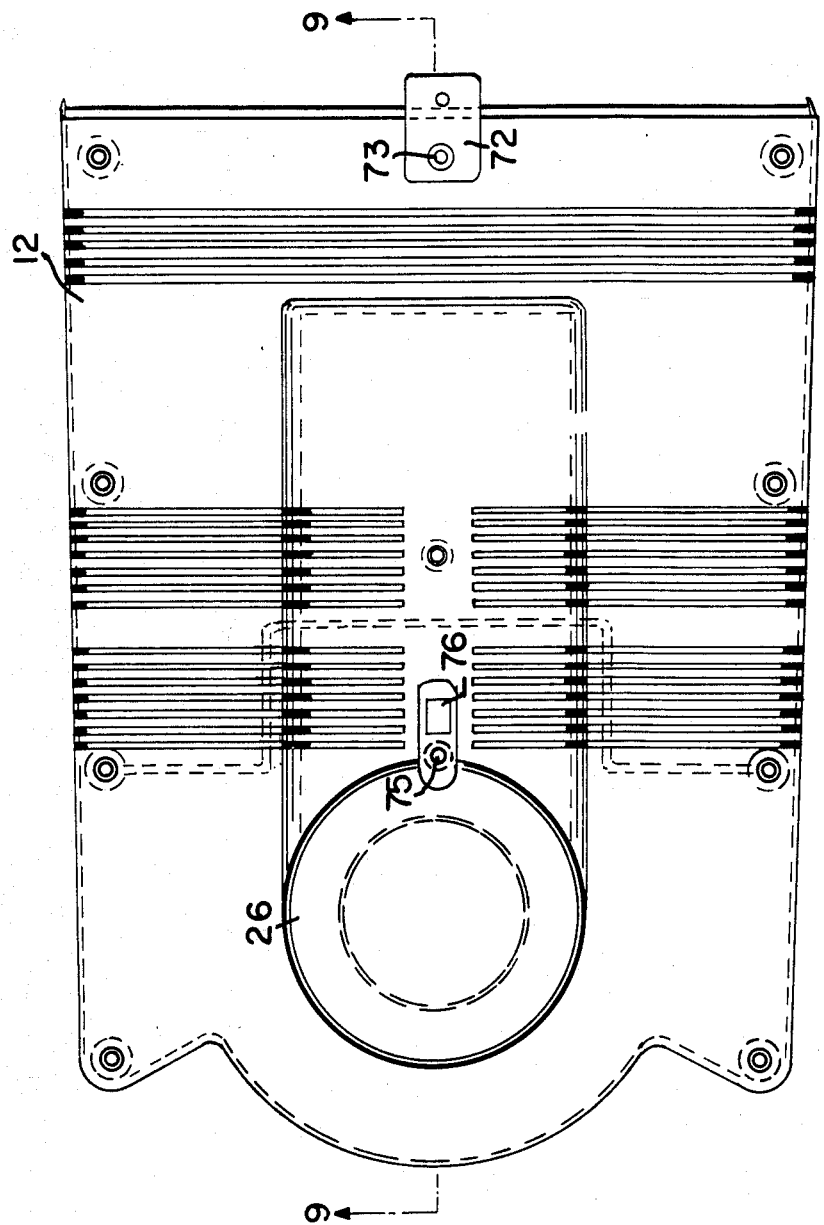
FIG. 8 is a top view of the upper housing member.

FIG. 8 illustrates a top view of the upper housing member 12 including the motor housing 26. Looking at the rearward portion of the upper member 12 there is a rectangular shoulder 72. Provided on the rectangular shoulder 72 is a raised button 74. The raised button 74 is utilized for retaining the hinged door 42 in a closed position in cooperation with the biasing means 46; this occurs when the cutting apparatus 10 is completely assembled. Also, there is provided an opening (rectangular in this embodiment) 76 towards the forward portion of the upper member 12. In order to reduce the number of reference numbers on the drawings, the connecting screws 24 on upper member 12 are not shown, but are shown on FIG. 1 and FIG. 3.

Figure 9:
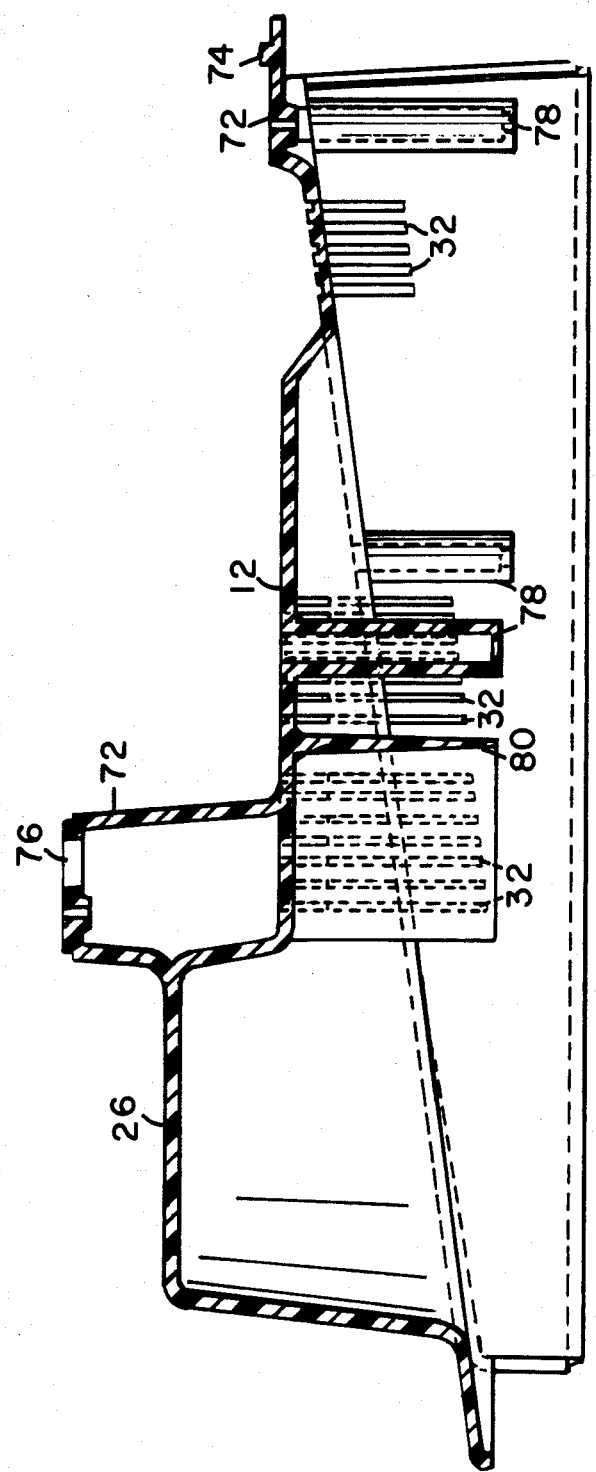
FIG. 9 is a side cross sectional view of the invention, not including the motor means, taken along lines 9—9 of FIG. 8.
Figure 10:
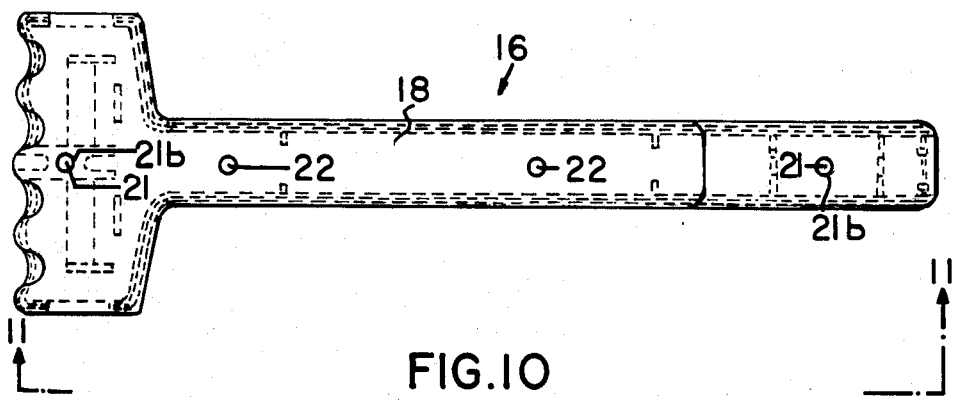
FIG. 10 is a top plane view of the top portion of the cutting apparatus handle.
Figure 11:
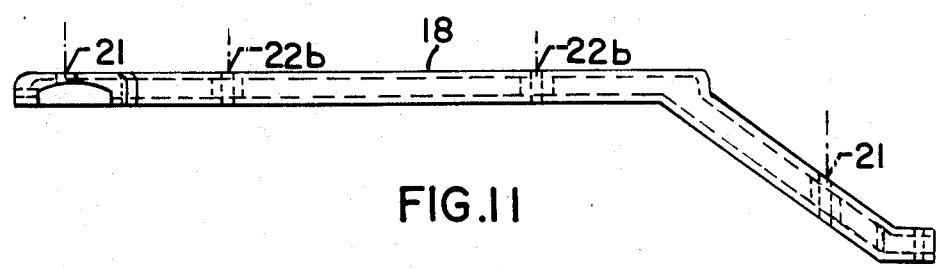
FIG. 11 is a side view of the top portion of the cutting apparatus handle taken along lines 11—11 of FIG. 10.
Figure 12:
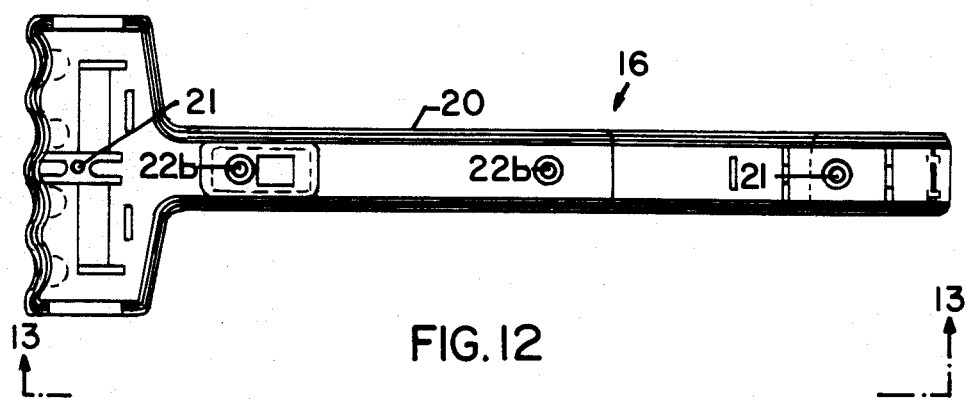
FIG. 12 is an inside view of the lower portion of the cutting apparatus handle.
Figure 13:
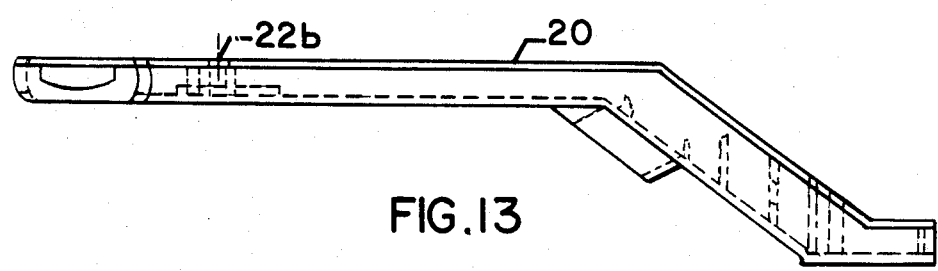
FIG. 13 is a side view of the lower portion of the apparatus handle taken along lines 13—13 of FIG. 12.
Figure 14:
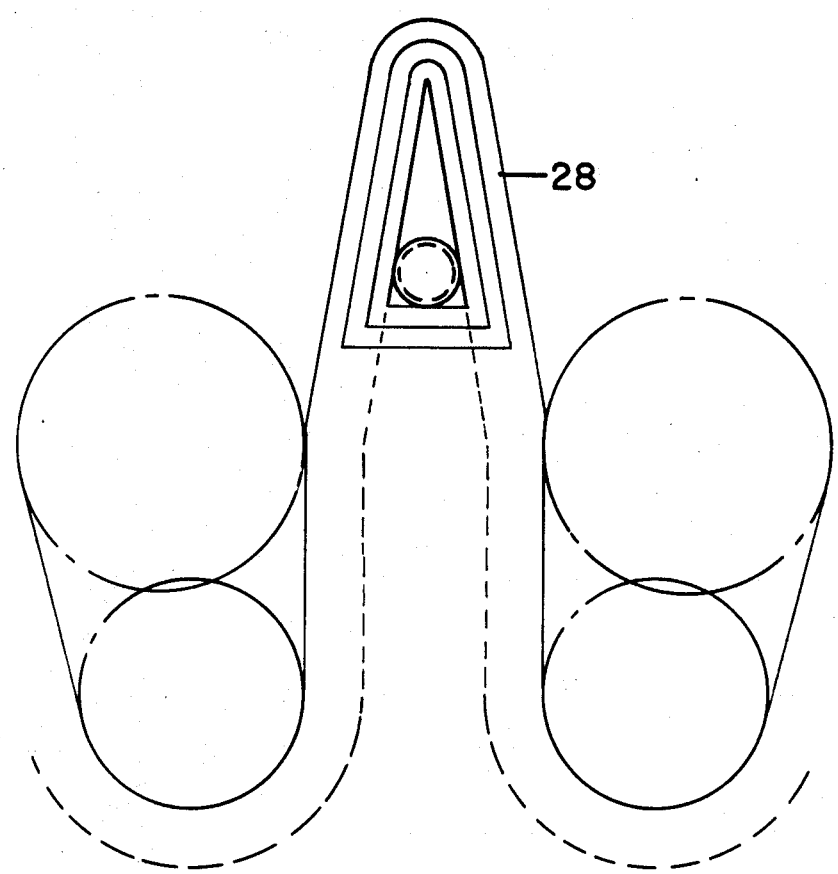
FIG. 14 is an enlarged view of a tine member of the forward portion of the cutting device taken along line 14 of FIG. 5.

FIG. 9 is a view of the upper housing member 12 taken along 9—9 of FIG. 8 and illustrates mounting posts 78 which are complimentary and in alignment with mounting posts 50 and 50a, located on the lower housing member 14 (see FIG. 5 and FIG. 6). Also found on the lower surface of the upper housing member 12 is a downwardly extending projection 80 which is designed to fit in a channel defined by shoulders 70a and 70b which are located on intermediate member 62. It can be seen that the forward portion of upper housing member 12 is lower in height (excepting housing 26) than the rearward portion. In other words, there exists a rising slope in a rearwardly direction.

The handle member 16 is illustrated in FIGS. 10, 11, 12 and 13. The handle 16 is made of two separate members 18 and 20 which are connected together by screws 22 used in conjunction with apertures 22a found on handle members 18 and 20 respectively. The handle member 16 when assembled defines a channel which contains all the wiring and switches necessary to power and control the motor 64 to which electrical power is distributed by means of a power cable 82.

The design of the cutting apparatus 10 is revolutionary for use in a rotary trimmer. This in conjunction with the novel cutting blades incorporated therein greatly multiplies the ease with which the cutting apparatus 10 can be used and increases the cutting efficiency. There is shown in FIG. 15 the novel cutting blade 84 mounted on a blade housing member 86 by conventional means such as screws or rivets at 88. The blade housing member which is provided with an opening at 90 is connected to the motor 64 by slidably mounting the blade housing member 86 over a motor shaft 92 and securing this connection by means of a lock washer 94. In order to strengthen the mechanical connection between the blade housing 86 and the motor shaft 92, the blade housing member 86 is provided with a shoulder at 91 and the motor shaft is provided with a complementary keyway recession at 93 which prevents slippage between the two. it can be seen from FIG. 15 and FIG. 16 that the parallel cutting blades 84 are fabricated fron one unitary piece of material, preferably a metal such as reinforced steel or any material which has sufficient strength, and abrasion and impact resistance to provide reasonable and satisfactory service life. The cutting blades 84 have two side segments 96 and 98 and a terminating segment 100 which is angularly disposed with respect to a plane perpendicular to the longitudinal axis of said parallel segments 96 and 98. The outermost portions of said cutting blades 84 are provided with a plurality of serrations 102. A plurality of air fins 104 and a plurality of reinforcing ribs 106 are also provided on the blade housing member 86. The blade housing member 86 may be fabricated from a high strength plastic by preinjection molding systems or may be fabricated from a metalic material. The blade housing is also provided with a plurality of air vents 112 which provide cooling for the motor 64.

The assembly of the cutting apparatus 10 will now be discussed. The cutting blade housing 86 is slidably mounted over motor shaft 92 and locked in place by means of a lock washer 94. The intermediate housing member 62 is placed on top of the bottom member 14 such that tines 28 and 30 are all in alignment, the mounting posts 50 located on the lower housing member 14 are in alignment with openings 68 located on the intermediate member 62. This results in the mating of the curvilinear shoulders 52 and 56 located on the lower housing member with the curvilinear shoulders 108 and 110 thereby forming a defined chamber which functions as a discharge passage from the forward end where the cutting blades 84 are located to the rearward portion of the apparatus 10. The upper housing member 12 is now superimposed over the intermediate member 62 in a fashion such that mounting posts 50, on the lower housing member 14, the openings 68 on the intermediate members and the openings 24a found on the upper housing member 12 are in alignment. All the mounting posts used herein are provided with an opening therethrough. Connecting screws 24 are then placed through the aligned openings and all three members 12, 14 and 62, are secured to each other.

The bottom handle member 18 is placed on top of the upper housing member 12 such that at least two of the openings 21b are in alignment with the openings 73 and 75 found on the upper housing member 12 into which are inserted connecting screws 21. Conventional electrical wiring and switches are placed in a recess defined by the bottom handle portion 20. The top handle portion 18 is placed over the bottom handle portion and threadedly connected to each other by conventional connecting means such as screws 22 through openings 22b.

The electrical system employs a conventional electric motor which can operate either on AC or DC current depending on whether a rectifier is provided. The motor must be of sufficient power to rotate the cutting blades at an RPM rate of 3000 to 7500 during normal use. Electrical leads from the motor 64 are taken to the handle 16 through the opening 76 provided on the upper member 12. All the electrical connections are made within the confines of handle member 16. In order to energize the cutting apparatus 10 it is necessary to simultaneously depress switch 34 and either switch 36 or 38. Two switches must always be on, otherwise the circuit will be broken. Having switches 36 and 38 on the T-shaped handle portion lends the cutting apparatus 10 to use by left handers and right handers.

In operation, the rotating housing member would rotate in a clockwise direction (FIG. 15). The cutting blades 84 in conjunction with the air fins 112 generate an airstream towards the rear of the cutting apparatus 10. The rotating cutting device 10 when in use is pushed in the direction of the vegetation to be cut, the tines 28, 30 separate the vegetation to be cut prior to actual cutting. The air stream generated by the combination of the rotating blade housing 86 and the air fins 104 result in the cut debris to be propelled through the channel formed by the pair of projected curvilinear shoulders 52 and 56 provided on the lower housing member and the pair of projected curvilinear shoulders 108 and 110 provided on the upper housing member. This debris is propelled to the rear of the cutting apparatus 10 which is the collecting receptacle for the debris. Thus no collecting bags are required. To empty the cutting apparatus, all one does is to open the hinged door 42 and discharge the contents.

It has been discovered in field trials that the cutting blades 84, brecause of the unique shaped configuration used and the serrated edges in combination with the angularly disposed cutting edge 102, results in the vegetation being cut into a fine residue thereby lessening the volume required for collection purposes.

The outermost edge of the cutting edge 102 is such that the edge 102 rotates entirely within the circle formed by the inside boundaries of the tines 28 and 30. The edge 102 being just short enough to clear everything and long enough for maximum cutting efficiency.

Again referring to FIGS. 1 and 2, the unique design of the instant cutting apparatus can be seen at the forward end where the tines 28 and 30 are positioned, that the vertical dimension is very minimal and that the vertical dimension increases in a rearwardly direction which ends at the hinged door 42 where the vertical dimension is the greatest. This permits the cutting apparatus to be used in narrow confines, reduces the physical dimensions where not needed, thus minimizing the weight of the apparatus 10. The handle 16 is designed for ease in holding and since two hands are required to operate the cutting apparatus 10, the weight is distributed.

The rotary cutting apparatus described herein provides a unique, efficient and simple construction for a cutting apparatus which permits the cut vegetation to be collected within the cutting apparatus and to be easily disposed. The construction eliminated the need for attaching any kind of collection bag to the cutting device.

Though some changes may be made in the construction of the cutting apparatus described herein without departing from the real spirit and purpose of our invention, it is our intention to cover by our claims, any modified forms of structure or use of mechanical equivalents which may be reasonably included within their scope.

We claim:

1. In a rotary device for cutting vegetation and the like, comprising:
   an angularly shaped housing member including a motor housing on an upper surface thereof,
   motor means mounted in said motor housing, said motor means including an extending rotatable power driving shaft,
   a handle mounted on said angularly shaped housing and having means therein for accommodating control means and power delivery means for said motor means,
   a rotatable blade housing member including cutting blades, said rotatable blade housing securedly mounted to said power driving shaft, said cutting blades describing a plane generally perpendicular to said power driving shaft,
   a guard member having a plurality of spaced apart projections arranged circumferentially around and beyond the radius described by said cutting blades, said projections describing a plane generally parallel to plane described by said cutting blades, said projections separating vegetation prior to cutting, and
   said angularly shaped housing further including internal thereto, a channel defined at one end by a rdaius exceeding that of a radius described by said rotating cutting blades and at another end in a generally rectangular configuration, said rectangular configuration being located at a rearward portion of said cutting rotary device providing collection space for said cut vegetation and including means for discharging said cut vegetation.

2. In a rotary device for cutting vegetation and the like, comprising:
   a housing member having a forward portion and a rearward portion, where said forard portion and said rearward portion define a chamber, wherein the vertical dimension of said chamber increases in a rearwardly direction,
   motor means including a rotatable power driving shaft mounted in the forward portion thereof,
   a handle mounted on said housing member including control means and power delivery means for said motor means,
   a plurality of cutting blade units secured to said rotatable power driving shaft, wherein each cutting blade unit includes a plurality of cutting blade elements,
   a guard member for said rotating cutting blade units, said guard member having a plurality of spaced apart projections arranged circumferentially beyond a radius greater than that described by said rotating cutting blade units, said projections describing a plane generally parallel to a plane described by said cutting blade units, said projections separating vegetation prior to cutting, and
   said housing member further including a defined channel at the forward thereof defined by a radius larger than that radius described by said cutting blade units, and at the rearward thereof opening into a generally rectangular chamber for providing collection space for said cut vegetation and including means for removing said cut vegetation.

3. In a rotary device for cutting vegetatin and the like, comprising:
   a housing member having a forward portion and a rearward portion, where said forward portion and said rearward portion define a chamber, wherein the vertical dimension of said chamber increases in a rearwardly direction,
   motor means including a rotatable power driving shaft mounted in the forward portion thereof,
   a handle mounted on said housing member including control means and power delivery means for said motor means,
   a plurality of cutting blade units secured to said rotatable power driving shaft wherein each cutting blade unit includes a plurality of cutting blade elements,
   a guard member for said rotating cutting blade units, said guard member having a plurality of spaced projections arranged circumferentially at a radius exceeding a radius described by said rotating cutting blade units, said projections describing a plane generally parallel to a plane described by said cutting blade units, said projections separating vegetation prior to cutting, and said housing member further including a channel defined at the foward thereof by a radius larger than that radius described by said cutting blade units, and at the rearward thereof describing a generally rectangular chamber for providing collection space for said cut vegetation and including means for removing said cut vegetation.

4. The device described in claim 3 whereins aid cutting blade units describe a plane perpendicular to said rotatable power driving shaft and in which at least one cutting blade element of one cutting blade unit describes a plane perpendicular to a plane described by the remainder of said blade of said cutting blade elements in said cutting blade unit.

5. In a rotary device for cutting vegetation and the like, comprising:
- a housing member having a forward portion and a rearward portion, where said forward portion and said rearward portion define a chamber, wherein the vertical dimension of said chamber increases in a rearwardly direction,
- motor means including a rotatable power driving shaft mounted in the forward portion thereof,
- a handle mounted on said housing member including control means and power delivery means for said motor means,
- a plurality of cutting blade units secured to said rotatable power driving shaft and describing a plane perpendicular to said rotatable power driving shaft, wherein each cutting blade unit includes a plurality of cutting blade elements, and in which at least one cutting blade element of one cutting blade unti describes a plane perpendicular to a plane described by the remainder of said cutting blade element in said cutting blade unit,
- a guard member for said rotating cutting blade units, said guard member having a plurality of spaced apart projections arranged circumferentially such that said rotating cutting blade units can rotate freely within the circumference of said projections, said projections describing a plane generally parallel to a plane described by said cutting blade units, said projections separating vegetation prior to cutting, and
- said housing member further including a channel for directing cut vegetation to a rearward portion of said housing member, said rearward portion describing a generally rectangular chamber for providing collection means for said cut vegetation and including means for removing said cut vegetation.

6. The device described in claim 5 wherein said blade cutting units include a plurality of air deflectors for directing cut vegetation to said collection means.

7. In a rotary device for cutting vegetation and the like, comprising:
- an angularly shaped housing, including a cylindrical housing having a defined channel extending from the forward portion thereof to the rearward portion thereof, said rearward portion of said angularly shaped housing providing collection space for said cut vegetation,
- a handle mounted on said angularly shaped housing, and motor means mounted in said cylindrical housing,
- said motor means including an extending power driving shaft, said shaft being perpendicular to the longitudinal axis of said handle, said handle including control means and energizing means for said motor means,
- a rotatable blade housing member adapted to be driven by said power driving shaft, including at least one cutting blade member, said combination of blade housing member and said cutting blade member describing a plane generally perpendicular to said power driving shaft, and
- a plurality of radially extending tines disposed forward of said angularly shaped housing and describing a radius exceeding a radius described by said cutting blade member, said tines describing a plane parallel to that described by said cutting blade member.

8. In a rotary device for cutting vegetation and the like, comprising:
- an angularly shaped housing, including a cylindrical housing having a defined channel extending from the forward portion thereof to the rearward portion thereof, said rearward portion of said angularly shaped housing providing collection space for said cut vegetation,
- a handle mounted on said angularly shaped housing, and motor means mounted in said cylindrical housing,
- said motor means including an extending power driving shaft, said shaft being perpendicular to the longitudinal axis of said handle, said handle including control means and energizing means for said motor means,
- a rotatable blade housing member adapted to be driven by said power driving shaft, including at least one cutting blade member, said cutting blade member further includes a plurality of cutting segments and in which at least one cutting segment is angularly disposed with respect to the remaining cutting segments, said cutting segments further including a plurality of serrated edges on a portion of said cutting segments, said combination of blade housing member and said cutting blade member describing a plane generally perpendicular to said power driving shaft, and
- a plurality of radially extending tines disposed forward of said angularly shaped housing and describing a radius exceeding a radius described by said cutting blade member, said tines describing a plane parallel to that described by said cutting blade member.

* * * * *